Figure 1:
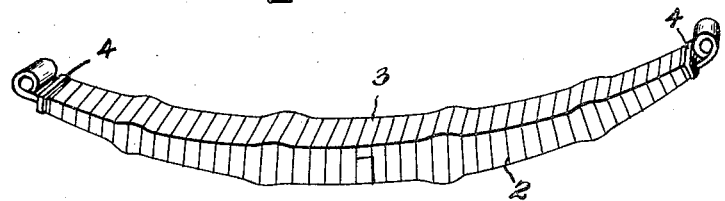

March 3, 1936. L. A. LAURSEN 2,032,583
SPRING AND METHOD OF MAKING SAME
Filed Jan. 22, 1935

INVENTOR
LAURITIS A. LAURSEN.
BY
ATTORNEYS

Patented Mar. 3, 1936

2,032,583

UNITED STATES PATENT OFFICE 2,032,583

SPRING AND METHOD OF MAKING SAME

Laurits A. Laursen, Akron, Ohio

Application January 22, 1935, Serial No. 2,952

6 Claims. (Cl. 18—59)

My invention embodies a novel type of rubber covered spring of the class used upon vehicles and comprising a spring unit including an assembly of resilient leaves. The invention also comprehends a novel method of producing rubber covered springs of the kind above referred to.

I am aware that it has been heretofore proposed in the art to make rubber covered springs. The object of providing the spring unit with a rubber cover is to virtually hermetically seal the various spring leaves against the admission of air or liquid such as water or oil, or other foreign matter, into the space surrounded by the rubber covering which extends over the entire body of the spring unit, after the covering has once been applied. By such provision the entrance of foreign matter, such as dirt, oil, grease, or the like, between the leaves of the springs, and the tendency for rust growth on or between the spring leaves are prevented. If an efficient rubber or equivalent covering hermetically sealing the spring unit elements can be produced, it is obvious that the original efficiency of the spring unit as originally calibrated and as originally installed upon a vehicle for the usual purposes in connection with the latter, may be maintained.

So far as I am aware, no practicable method of producing rubber covered spring units has thus far been developed. It is clear to one versed in the art that the manner of assembling the leaves of an ordinary vehicle spring is conducive to the formation of air pockets or spaces adjacent to the extremities of the various leaves, which are of graduated lengths, after the covering is applied to the unit. It is virtually impossible to eliminate the formation of said small air pockets or spaces at the leaf ends in the assembly that goes to make up the final spring structure. On this account a substantial difficulty has arisen heretofore in the application of a rubber covering to the spring unit in such a manner as to provide an effective enclosure member under all conditions of production.

With the foregoing in view I have worked out a feasible and practical commercial mode of forming a combination unit of the class referred to, and the same involves a peculiar method of applying the uncured rubber stock to the spring unit so as to enclose the unit as snugly as possible and reduce the air pockets or spaces to a minimum size.

For the effective curing of the rubber covering about the spring unit I avail of a special method which I believe is the only one suited to commercial purposes, said method involving the subjecting of the uncured rubber stock, when properly applied to the unit, to high pressure much in excess of the proper curing temperature pressure. In this way I am able to maintain the uncured rubber stock in close contact with the elements of the spring unit about which it is to be vulcanized, and the liability of expansion of any air or gases trapped in the small air pockets or cells between the spring leaves and the uncured rubber is prevented. Such expansion of said air and gases would, in the absence of the particular method above specified, cause blowing out or ballooning of the rubber stock from which the final cured rubber covering is to be made, and obviously the said blowing out or ballooning would prevent the formation of an efficient and complete covering member.

With the foregoing in mind I have illustrated in the accompanying drawing a common type of vehicle spring having the rubber stock for the formation of the cover applied thereto according to the method of my invention.

In the said accompanying drawing,

Figure 1 is a perspective view of a spring unit equipped with a cover made in accordance with the invention.

Figure 2:
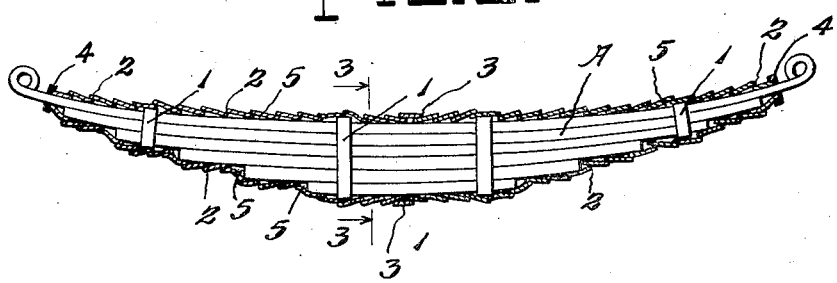

Figure 2 is a longitudinal sectional view of such spring unit, illustrating the cover as when in raw state, the illustration being designed to bring out the manner of wrapping the uncured rubber stock about the leaves making up the spring unit, the wrapping commencing at the smaller end of the unit and near the terminal of the longest leaf thereof and continuing toward the central portion of the unit.

Figure 3:
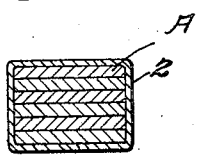

Figure 3 is a cross-sectional view on the line 3—3 of Figure 2.

Proceeding with a more detailed description of my invention, I note that the spring unit A is made up of a series of superposed resilient leaves after the manner of the building of an ordinary vehicle spring such as employed largely today in conjunction with automotive vehicles. The spring unit leaves are of graduated lengths as customary, and each lower leaf terminates a predetermined distance short of the end of its superposed leaf. On the above account, it is evident that corner-like pockets are located at the ends of the various leaves of the spring unit below the top-most leaf which is shackled to the vehicle frame. No matter how snugly a covering member may be applied to the spring unit A, it is practically impossible to avoid the small air pockets or spaces at the ends of the lower leaves and adjacent to the clamps 1 by which the various spring leaves are held assembled as a unit.

According to my invention, in order to provide the rubber cover which is to be vulcanized about the unit A, I take the uncured rubber stock in the form of a long strip of comparatively narrow dimension, and I wind the strip first about the end portion of the uppermost or longest leaf of the unit A and then gradually carry the strip around and toward the center of the unit A, by a spiral winding action. Care is taken that in producing the spiral windings, the said windings be caused to slightly overlap one another at the adjacent edges as is illustrated at 2 in the drawing.

In producing a complete cover, the uncured stock will preferably be wound from each smaller or outer end of the spring unit to a point approximately at the center of the unit as designated at 3, at which point a final middle wind or two may be produced so as to joint the stock that extends spirally from each end of the spring unit to said center portion.

It is desirable that at the small ends of the spring where the uncured stock wrapping or winding commences there be applied a contracting loop or band 4 which may be made of an inelastic tape, though I preferably employ a cured rubber band small enough to require expansion when applied as stated, thereby producing a pressure effect upon the uncured stock at the extremities of the spring where the beginnings of the wrappings of said stock are found. If desired, also, the contracting pressure of a band or any equivalent member may be applied at the central portion of the spring unit where the spiral wrappings of the uncured stock, passed about the unit, may meet.

With the foregoing method of applying the uncured stock to the spring unit A, I reduce to a minimum capacity the small air or gas pockets which are designated 5 at several places in Figure 2, said air pockets being slightly exaggerated in the illustration, which is not in proportion to a full sized covered spring structure.

After covering the spring unit A in the manner above described, the combined unit including the spring leaves and the uncured rubber stock wrapped about the same may be introduced into the curing or vulcanizing chamber. It is desired that the vulcanizing operation take place while the combined unit aforesaid is maintained with the uncured rubber stock naked or uncovered.

I find that the feasible and commercial method for vulcanizing the cover and thereby hermetically sealing the same to the spring unit A for enclosing the movable elements of the latter is to submerge the combination unit thus built up, in fluid. The fluid is brought to proper curing temperature and pressure to cause the curing of the rubber stock surrounding the spring unit A, but before the curing is performed the submerging fluid is subjected to pressure higher or greater than the curing temperature pressure, for the purpose previously suggested herein, namely, to prevent the expanding of the air or gases that may be trapped between the uncured rubber stock and the metal parts of the spring, which expanding would produce blow holes or cause ballooning of portions of the stock in the curing operation, thereby defeating the objects of the invention in producing a properly hermetically sealed-in-rubber spring structure. The curing temperature and pressure suitable for the purposes of the invention might be indicated as approximately 300° F. and 50 lbs., respectively. The higher pressure to which the combination covered spring unit with its uncured rubber covering is subjected while submerged in fluid, may be approximately 150 lbs. I do not wish to be limited to the exact curing temperature and pressure conditions stated, nor to the exact amount of the greater pressure which is applied to the combination unit and particularly to the covering of uncured rubber stock while it is undergoing the curing operation. The temperatures and pressures stated are suitable for the purposes of the invention but may be modified somewhat so long as the principle involved is carried forward.

For the purposes of the commercial curing of my covering as applied to the spring unit, there may be availed of the apparatus and methods which are set forth in my United States Letters Patent Nos. 1,665,308, 1,665,309, 1,665,310, and 1,665,311, of April 10, 1928.

The rubber band used for covering the springs can be started on one end and continuously wound in a spiral to the opposite end of the spring.

Having thus described my invention, what I claim as new and desire to secure by Letters Patent of the United States, is—

1. The process of making combination rubber covered spring units, which consists in wrapping a spring unit structure with a spirally applied strip of uncured rubber stock wound thereabout so that each winding at its edge slightly overlaps the edge of the preceding winding, and subjecting said combination cover and spring unit to a vulcanizing operation while the uncured cover stock is maintained under a pressure greater than the curing temperature pressure.

2. The process of making combination rubber covered spring units composed of a plurality of superimposed leaves of graduated lengths, which consists in wrapping a spring unit structure with a spirally applied strip of uncured rubber stock wound thereabout so that each winding at its edge slightly overlaps the edge of the preceding winding, and subjecting said combination cover and spring unit to a vulcanizing operation to cure the cover stock and seal it about the spring structure.

3. The method of making a combination rubber covered spring unit comprising a spring structure composed of a series of juxta-posed leaves of graduated lengths, which consists in wrapping a strip of uncured rubber stock around the spring unit, commencing the wrapping at a smaller end of the spring structure, and continuing the same toward the portion of the spring structure of largest dimension, edge portions of the strip of uncured stock being slightly overlapped as it is spirally wound around the spring structure, and causing the vulcanizing of the said uncured rubber stock wound about the spring structure while subjected to pressure substantially in excess of the curing temperature pressure employed incident to the vulcanizing operation.

4. The method of making a combination rubber covered spring unit comprising a spring structure composed of a series of juxta-posed leaves of graduated lengths, which consists in wrapping a strip of uncured rubber stock around the spring unit, commencing the wrapping at a smaller end of the spring structure, and continuing the same toward the portion of the spring structure of largest dimension, edge portions of the strip of uncured stock being slightly overlapped as it is spirally wound around the spring structure, sealing the said strip of uncured rubber stock to the smaller end of the spring structure, at which its winding is commenced, by a contractible pressure element, and causing the vulcanizing of the said uncured rubber stock wound about the spring structure while subjected to pressure substantially in excess of the curing temperature pressure employed incident to the vulcanizing operation.

5. As a new article of manufacture, a combination rubber covered spring unit comprising a spring structure composed of a plurality of leaves, and a rubber covering therefor hermetically sealed about said leaves and enclosing the latter, said rubber covering consisting of a strip of curable rubber stock wound spirally around the spring structure so that the edges of the strip slightly overlap, the said rubber stock being vulcanized so as to provide an impervious enclosing covering for said spring structure.

6. The process of making a combination rubber covered spring unit, which consists in applying to a spring structure composed of juxta-posed leaves of graduated lengths a rubber covering, applying said rubber covering by causing strips of uncured rubber stock to be wound spirally about the spring structure from each small end thereof to the central portion of largest dimension, uniting the said strips at the point of their meeting at the central portion of the spring of largest dimension, and vulcanizing said uncured rubber strips under pressure substantially in excess of the curing temperature pressure necessary for the vulcanizing operation.

LAURITS A. LAURSEN.